Oct. 9, 1945. W. H. HUNTER 2,386,610
FRICTIONAL MECHANISM
Filed Oct. 30, 1943

Inventor
Willson H. Hunter
By Willis F. Avery
Atty.

Patented Oct. 9, 1945

2,386,610

UNITED STATES PATENT OFFICE 2,386,610

FRICTIONAL MECHANISM

Willson H. Hunter, Akron, Ohio, assignor to The B. F. Goodrich Company, New York, N. Y., a corporation of New York Application October 30, 1943, Serial No. 508,305

5 Claims. (Cl. 188—152)

This invention relates to frictional mechanism such as brakes and clutches involving frictionally engageable parts.

The provision of an annular member expansible by fluid pressure for the purpose of urging brake blocks, or other elements, into contact with a brake drum, offers advantages in the way of simplicity of structure, uniformity of braking action and other desirable results. It is desirable to provide for spring retraction of the braking elements upon deflation of the expansible member for most effective operation, and for this purpose springs have been provided with the braking elements which have been surmounted upon the expansible member. Owing to the desirability for compactness of structure it is sometimes difficult to provide full effectiveness of such retractor springs associated solely with the brake blocks, especially in cases where a relatively high degree of radial travel of the blocks and expansible element is desired.

It is an object of this invention to provide spring retraction acting directly on the expansible element in a manner supplementing the springs of the brake block so that the latter springs need not have the entire burden of effecting retraction of all the movable parts. Further objects are to provide in an annular expansible member a retractor spring or springs acting at the radially outer face thereof, and to provide for action of such springs continuously around the annular expansible member. A still further object is to provide for accommodating the retractor springs in recesses in the material of the expansible member in a manner to avoid interference with associated brake blocks and in a manner to promote uniformity of expansion and retraction across the width of the expansible member.

These and other objects will be apparent from the following description, reference being had to the accompanying drawing in which.

Figure 1:
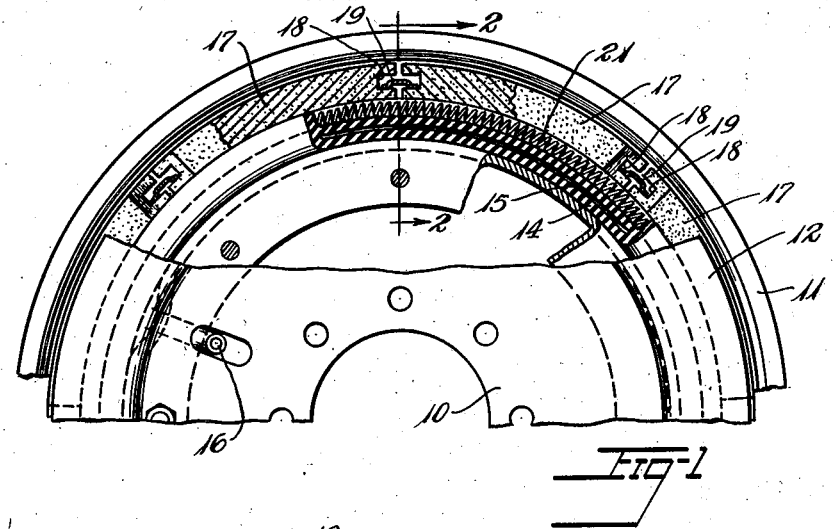
Fig. 1 is a side elevation, with parts sectioned and broken away, of a brake assembly constructed in accordance with and embodying the invention.
Figure 2:
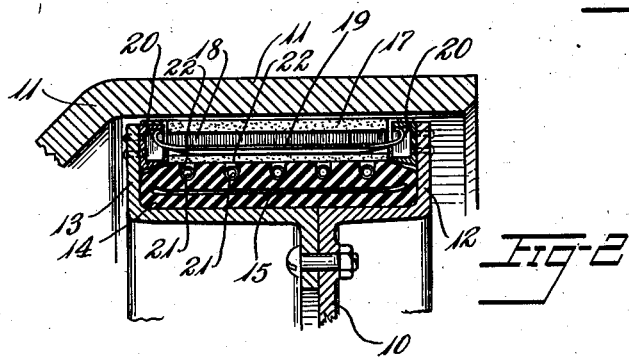
Fig. 2 is a section taken along the line 2—2 of Fig. 1.
Figure 3:
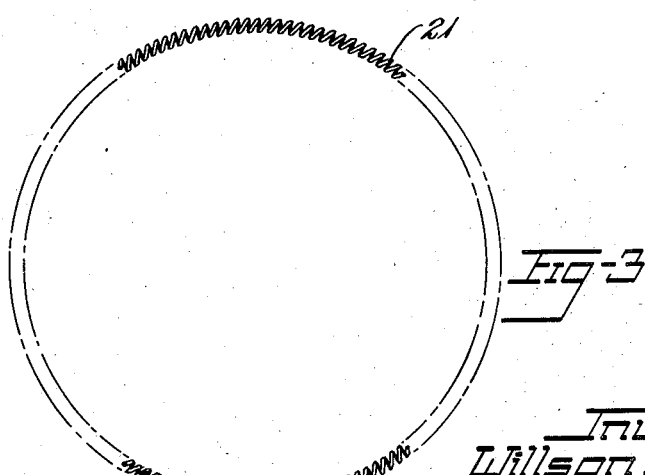
Fig. 3 is a side elevation, with portions indicated in broken lines, of one of the annular retractor springs.

The invention is illustrated as applied to a brake in which a torque frame 10 is mounted within a brake drum 11, the torque frame having flanges 12, 13 providing at its outer periphery a channel for accommodating parts of the braking mechanism.

An expander tube 14 having an inner chamber 15 in communication with a conduit 16 for conducting inflating fluid, is mounted at the bottom of the channel. Upon the expander tube is positioned a circumferential series of brake blocks 17, 17, each having its ends slotted at 18, 18 to receive retractor springs 19, 19 bridging the opposed ends of adjacent blocks and bearing upon the floors of the slots to urge the blocks radially inward, the reaction being taken by engagement of the curved ends of the spring with the upper wall of lugs 20, 20 attached to the inner faces of the flanges 12, 13, which lugs engage in relieved corners of the blocks to resist the torque of braking.

In cases where a considerable extent of radial travel of the blocks is desired it may be undesirable to place the full burden of the retracting load upon the springs 19, 19, especially where the expander tube is such as to resist ready collapse upon deflation. To this end I provide retractor springs 21, 21 at the radially outermost face of the expander tube effectively to contract the outer wall of the tube and, in the case where the brake blocks are attached to the tube rather than disposed frictionally upon the same, to assist directly in the retraction of the blocks also.

The springs 21 may be of any suitable construction such as of the endless coil form shown. These springs preferably are seated in recesses or grooves 22, 22, in the outer face of the expander tube so as to be in non-interfering relation with the brake blocks. The expander tube may be of molded rubber or other rubber-like material with grooves 22, 22 molded therein and the springs may be mounted in the grooves after final vulcanization of the tube. Alternatively, the springs may be mounted in the tube during manufacture so as to be attached permanently to the rubber by vulcanization of the product.

The retracting force of the springs arranged as shown and described promotes both expansion and contraction of the tube in a uniform manner across the width of the same and also uniformly about the periphery thereof to the end of maintaining true concentricity of the working parts and uniformity of the braking action both in a dimensional sense around the periphery of the brake and in a duration sense throughout many braking operations.

Variations may be made without departing from the scope of the invention as it is defined in the following claims.

I claim:

1. A frictionally engageable structure comprising an expansible member having a movable arcuate surface, and circumferentially continuous means for retracting the same comprising a retractor spring associated with said expansible member radially within the confines of said surface for direct action on the expansible member.

2. A frictionally engageable structure comprising an annular expander tube having a movable outer face displaceable in the radial direction and retractor spring means mounted radially within the wall of said tube at the radial outer face thereof, said spring means being circumferentially endless and circumferentially extensible.

3. A frictionally engageable structure comprising an annular expander tube displaceable in the radial direction, said tube being circumferentially grooved in its radial outer face and a retractor spring mounted in the groove and substantially contained therein.

4. A frictionally engageable structure comprising an annular expander tube displaceable in the radial direction, said tube having axially spaced annular grooves in the radial outer face thereof and annular coil springs seated in said grooves.

5. A brake comprising a torque flange having a channel in its outer periphery adjacent to a brake drum, an expander tube seated in the bottom of said channel, brake blocks mounted upon said tube, retractor springs in contact with said blocks and walls of said channel, said tube at its radially outer face having a series of axially spaced-apart grooves and annular coil retractor springs mounted in said grooves.

WILLSON H. HUNTER.